Figure 2:
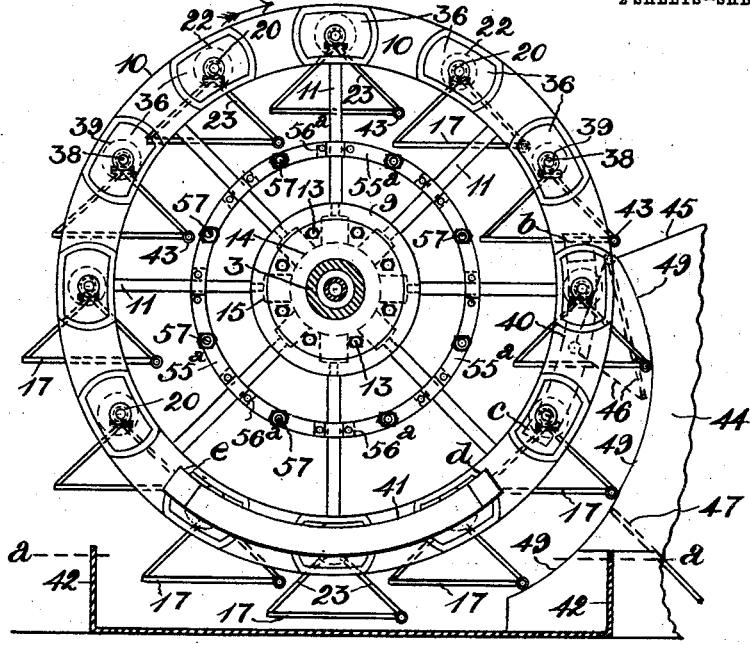

A. J. ARBUCKLE.
FILTERING APPARATUS.
APPLICATION FILED OCT. 19, 1908.

924,721.

Patented June 15, 1909.
2 SHEETS—SHEET 1.

Witnesses:

Inventor:
Alexander John Arbuckle

A. J. ARBUCKLE.
FILTERING APPARATUS.
APPLICATION FILED OCT. 19, 1908.
924,721.
Patented June 15, 1909.
2 SHEETS—SHEET 2.
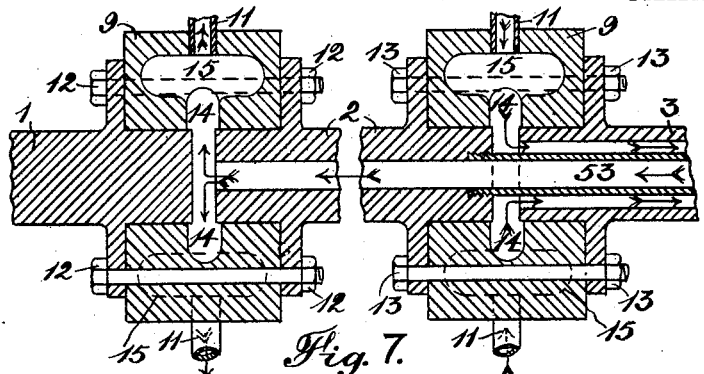
Fig. 7.
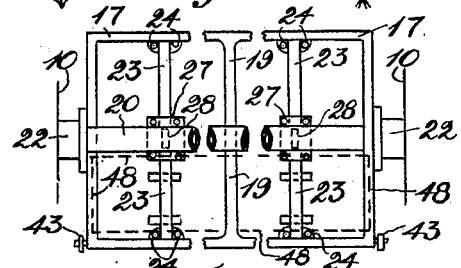
Fig. 3.
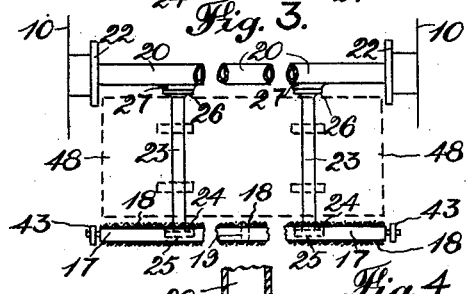
Fig. 4.
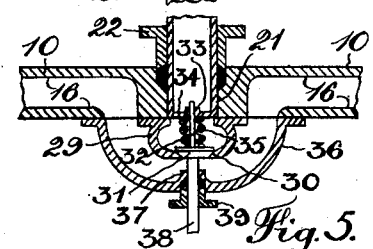
Fig. 5.
Fig. 6.
Witnesses:
Chas. Ovendale
H. Ovendale
Inventor:
Alexander John Arbuckle

UNITED STATES PATENT OFFICE.

ALEXANDER JOHN ARBUCKLE, OF JOHANNESBURG, TRANSVAAL.

FILTERING APPARATUS.

No. 924,721.  Specification of Letters Patent.  Patented June 15, 1909.

Application filed October 19, 1908. Serial No. 458,542.

*To all whom it may concern:*

Be it known that I, ALEXANDER JOHN ARBUCKLE, a subject of the King of Great Britain, and resident of Johannesburg, Transvaal, have invented certain new and useful Improvements in Filtering Apparatus, of which the following is a specification.

The present invention relates to filtering apparatus of the kind wherein the liquid is drawn by suction through the interstices of the filtering medium, and the adhering separated solid matter is thereafter removed from the surface of said medium by a fluid under pressure passed therethrough in the opposite direction to the suctional flow.

While my invention is applicable for separating the liquid and solid constituents of any fluid mass, it is especially applicable for separating water, cyanid or other solvent solution, wash-water or other liquid from "slimes" (the finely comminuted particles of crushed ore), or any of such liquids from "sands" (the coarser particles of crushed ore), or the liquid from the solids of "battery pulp"—the mixture of sands, slimes and water as it comes from the crushing plant.

The object of the invention is to produce an efficient machine, of comparatively simple and inexpensive construction, with a large filtering area. By my improvements this object is attained in such a way that the whole of the filtering surfaces are unobstructedly exposed, and consequently said surfaces (as well as other vital parts of the machine) are easily accessible. This admits of the examination of such parts, and also of any necessary repairs or renewals thereof being effected with increased facility, and as a consequence prolonged stoppages, which are extremely undesirable, are thereby obviated.

In the construction of a filtering apparatus in accordance with my invention I employ two circular frames, each comprising a rim portion, a hub portion and a plurality of tubular spokes connecting said rim and hub portions. These circular frames are fixed at a suitable distance apart upon a horizontally disposed hollow driving shaft. Between the rim portions of these circular frames is suspended a plurality of oscillatory filter frames, arranged parallel with the axis of the driving shaft. Each of these filter frames comprises a rectangular skeleton frame which is covered top and bottom with a suitable filtering medium, a tubular shaft, and tubular members, which latter places the space formed between the coverings of filtering material upon the frame in communication with said tubular shaft. The ends of the tubular shaft are rotatably supported in holes formed through the rim portions of the circular frames, and suitable glands are fitted in the frames around the shaft. The rectangular skeleton frame, tubular shaft and tubular connecting members are preferably made as separable parts. Each of the circular frames is constructed in its rim portion to provide a plurality of circumferential passages, with which the tubular shafts of the several filter frames are placed in communication during predetermined portions of the revolution of the apparatus, by means of automatically actuated valves. The circumferential passages are placed in communication with a chamber formed in the hub portion of its frame by means of the tubular spokes. One of the circular end frames is utilized for the suction flow and the other for the back pressure flow. That portion of the driving shaft between the circular end frames is hollow, and said portion serves for placing the chamber in the hub of the one frame in communication with preferably the back pressure creating-apparatus. The chamber provided in the hub of the other frame is placed in communication with the suction creating-apparatus. The suction and back pressure connections are by these means both located at the same end of the apparatus.

The apparatus is so constructed and arranged that as it revolves the filter frames successively enter a well, tank or other vessel into which the mixture of liquid and solids to be separated is conducted. The suction valves are automatically opened when the filtering surfaces of the frames enter the mixture, and they are kept open during the period said surfaces are immersed. If desired, the suction may be maintained for any desired period after each filter frame rises out of the mixture in the tank, in order to draw out any liquid remaining in the solid matter adhering to the filtering surfaces, and to drain the passages and connections of the filtrate. The back pressure valves are opened in a similar manner after the suction valves have closed to detach the adhering solid matter from the filtering surfaces.

Means are preferably provided for suitably tilting or inclining the filter frames just before the back pressure is admitted, so that the detached solid matter will fall on to an inclined plane arranged to deliver it clear of the tank containing the mixture. The frames may also be fitted with a plate on one side to provide an inclined surface for diverting the solid matter detached from the next higher frame on to the aforementioned inclined plane. Means are also preferably provided for preventing violent oscillations of the filter frames or to insure their gently swinging back into position as they enter the tank.

I will now proceed with a more detailed description of the invention by aid of the accompanying drawings, in which—

Figure 1:
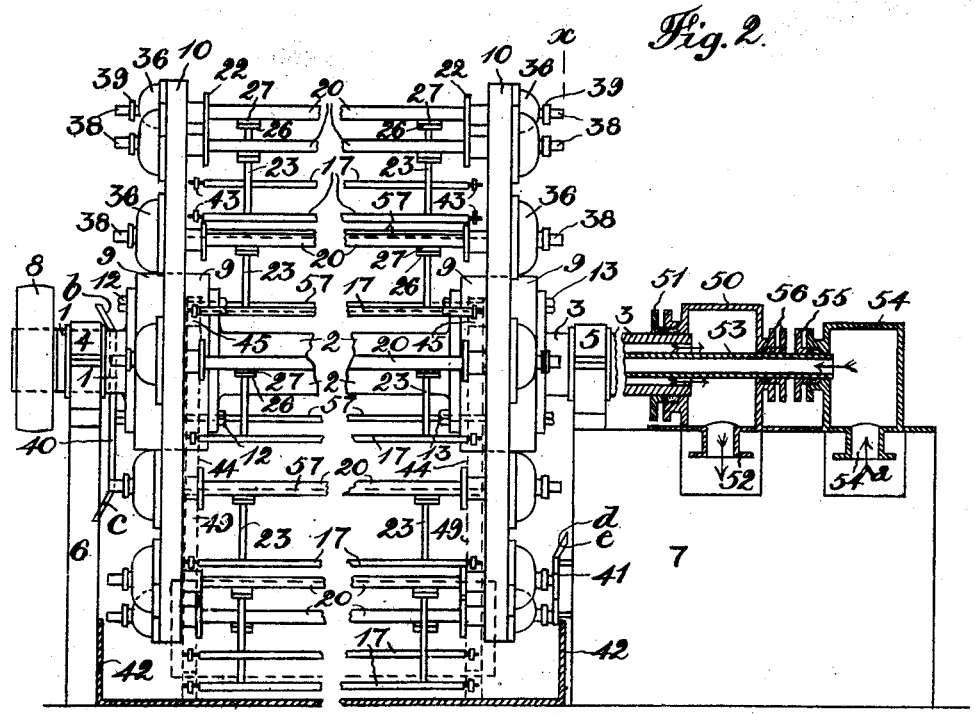

Figure 1 is a part sectional front elevation of the apparatus. Fig. 2 is a sectional end elevation on a plane indicated by the dotted line x—x in Fig. 1. Fig. 3 is a plan of portions of one of the filter frames with the filtering material removed. Fig. 4 is an elevation of Fig. 3 with the filtering material in position. Fig. 5 is a section of a portion of the rim of one of the circular frames and a portion of the tubular shaft of one of the filter frames and the valve for placing said shaft in communication with the circumferential passages in the rim. Fig. 6 is an elevation of a portion of the rim of one of the circular filter frames with the valve and cap removed. Fig. 7 is a longitudinal section of portions of the main driving shaft and the hub portions of both circular end frames illustrating the passages formed therein for the suction and back pressure flow.

The driving shaft, as illustrated in Figs. 1, 2 and 7, is constructed in three parts, a solid flanged part 1, an intermediate hollow part 2 flanged in proximity to both ends, and a hollow flanged part 3.

4, 5, are bearings for the driving shaft, carried upon suitable supports or foundations 6, 7.

8 is a pulley fixed on one end of the driving shaft for imparting rotary motion thereto by means of a belt. The shaft may be driven by any other suitable means adapted to rotate it at a suitable speed.

Each of the circular end frames comprises a hub portion 9, a rim portion 10 and a plurality of tubular spokes 11. The manner of fixing these frames to the driving shaft will be clearly understood on reference to Fig. 7 of the drawing. In the case of the one frame (the back pressure frame) the hub portion 9, which is bored out to fit the shaft, is secured between the flange on the part 1 and the flange on the one end of the part 2 by means of the bolts 12. The hub portion 9 is of such a width that a space is left in the bore thereof between the adjacent inner ends of the parts 1, 2 of the shaft. In like manner the hub portion 9 of the other circular end frame (the suction frame) is secured by means of the bolts 13 between the flange on the other end of the intermediate part 2, and the flange on the hollow part 3. In this case also the hub portion is of such a width that a space is left in the bore thereof between the inner ends of the parts 2, 3 of the shaft.

In the bore of each of the hub portions 9 is formed an annular recess 14—see Figs. 2 and 7. Spaces or chambers 15 are also formed in the hub portions 9, between the bolts 12, 13. The spaces 15 communicate with the annular recesses 14. The rim portion 10 of each circular frame is constructed with a plurality of circumferential passages 16—see Fig. 5. These passages 16 are placed in communication with the hub spaces 15 through the medium of the hollow spokes 11.

Each of the oscillatory filter frames (which are suspended between the rim portions 10 of the two circular end frames and are arranged parallel with the axis of the driving shaft) comprises—see Figs. 3 and 4—a lower rectangular skeleton frame 17, which is covered both top and bottom with any suitable filtering material 18. This filtering material 18 may be canvas or any other textile fabric of suitable texture stretched over and sewed or otherwise suitably attached to the frame 17. If desired wire screening or a suitable perforated metal plate may be placed next the frame beneath the textile fabric 18. The rectangular frame 17 may be constructed with one or more transverse ribs 19 for supporting the filtering material, or, if desired, for fixing it thereto. The rectangular frames 17 are suspended between the circular end frames by means of the tubular shafts 20, which, as shown in Fig. 5, project at their extremities into holes 21 formed in the rim portions 10 of said end frames.

22 are glands fitted in the rims 10 around the tubular shafts 20. The frames 17 are attached to the tubular shafts 20 by means of the tubular members 23. These members 23 at their lower ends are constructed with lugs 24—see Fig. 3. They are riveted, bolted or otherwise secured by means of said lugs 24 to lugs or projections 25—see Fig. 4—formed on the inside of the rectangular frames 17. The tubular members 23 extending from opposite sides of the frame are connected at their upper ends and formed with a flange 26—see Figs. 1 and 4, and the tubular shafts 20 are constructed on the underside with corresponding flanges 27 for bolting the parts 20, 23 together. Holes 28—see Figs. 3 and 5, are formed in the tubular shaft 20 which place the interior thereof in communication with the inside of the tubular members 23. In the construction shown the tubular members 23 are arranged in proximity to the ends of the shaft 20 and frame 17, but it is obvious that additional tubular members 23 may be provided and be suitably disposed along the length of the tubular shafts 20. The open lower ends of the tubular members 23 communicate with the space formed between the coverings of filtering material 18 as shown in Fig. 4.

On the outside of the rim portions 10 of both end frames is provided a plurality of automatically actuated valves, one for each end of each tubular shaft 20. These valves in the case of the one circular end frame serve for controlling the admission of the back pressure flow to the filter frames 17, and in the case of the other circular end frame for controlling the communication between the tubular shafts 20 and the passages 16 in the rim for the suction and filtering flow. The construction and arrangement of these valves is shown more particularly in connection with Figs. 5 and 6. On the outside of the rim 10 and over each of the holes 21 into which the ends of the shafts 20 project, is fixed a cap 29 which is constructed on the inside to form a valve seat 30. 31 is the valve which is provided on the inside with a guide pin 32 adapted to slide in a hole 33 formed in a bridge piece 34 on the end of the tubular shaft 20. 35 is a spiral spring which encircles the pin 32 and serves to maintain the valve 31 on its seat 30 in the cap 29. To the rim 10 over the cap 29 is fixed another and larger cap 36 which serves, as shown in Fig. 5, to place the adjacent ends of the circumferential passages 16 in communication. This cap 36 is constructed on the inside with a central boss 37, through a hole in which the valve spindle 38 projects. 39 is a gland fitted to the cap 36 around the valve spindle 38. The valve spindles 38 project for a suitable distance beyond the caps 36 and glands 39 and are adapted, as hereinafter described, to be moved inward to open the valve during pre-determined portions of the revolution of the apparatus. The valves for the back pressure are similar to those for the suction with the exception possibly that the springs are somewhat stronger, and sufficient to keep the valves closed against the back pressure.

For actuating the back pressure valves a suitably curved cam plate 40 is provided supported in any convenient manner in the position shown in Figs. 1 and 2. As the apparatus is rotated (the direction of rotation is indicated by the arrow in Fig. 2) the outer ends of the back pressure valve spindles come into contact with or engage the plate 40 at the point $b$ (see Figs. 1 and 2) and disengage it at the point $c$. The several valve spindles are by these means successively moved inward and their valves thereby maintained open through the arc $b$—$c$. The ends of the plate 40 are preferably curved outward as shown in Fig. 1 to insure due engagement thereof by the valve spindles and proper operation of the valves. If desired rollers may be provided on the outer ends of the valve spindles to engage the cam plates. The back pressure valves may, by suitably constructing and arranging the plate 40, be opened or closed earlier or later as preferred. A similar curved cam plate 41 is provided for actuating the suction valves in the rim portion 10 of the other circular frame. The outer ends of the spindles of the suction valves successively engage this plate 41 at the point $d$ and disengage it at the point $e$, so that the suction valves are kept open through the arc $d$—$e$. The plate 41 may, as shown in Fig. 1 be fixed to the support or foundation 7 of the bearing 5, or otherwise, as preferred. The suction valves may, by suitably extending the plate 41, be maintained open beyond the point $e$, so that the suctional flow will continue for any desired length of time after the filter frames have been raised above the level $a$—$a$, Fig. 2, of the mixture to be separated, in order to extract any liquid remaining in the solids which are caused to adhere to the surface of the filtering material 18, and to drain the passages of the filtrate. When the apparatus is in the position in which it is shown in Figs. 1 and 2 three of the suction valves are opened and two of the back pressure valves.

42 is the tank or pit provided beneath the filtering apparatus into which the mixture of solids and liquid to be separated is conducted in any convenient manner; it extends the full length of the filter frames. The level of the mixture is maintained at or about the height of the dotted line $a$—$a$ in Fig. 2. The tank 42 as shown is so arranged in relation to the revoluble portion of the apparatus, and made of such a shape and width, that the filtering surfaces of the filter frames remain submerged in the mixture for a suitable length of time.

In order to facilitate the removal of the separated solid matter from the surface of the filtering material 18 by means of the back pressure, I provide at each end of one of the longitudinal sides of the filter frames a roller 43, and in proximity to each circular end frame I provide a member 44 which, as shown, may be in the form of a suitably shaped vertical plate. The plates 44 are constructed in their upper portion to provide an inclined path or surface 45 with which the rollers 43 engage as the frames descend. The rollers by moving up the path 45 as the apparatus revolves, tilt or incline the filter frames, as shown in dotted lines at 46 in Fig. 2. The parts are so arranged that each frame is inclined just before its back pressure valve is opened. The detached solid matter then falls off the surfaces of the filtering material on to the chute or inclined plane 47 down which it falls clear of the apparatus. To insure the detached solids being properly deflected onto the chute 47 I may—as shown in dotted lines in Figs. 3 and 4—fix an inclined plate 48 to the tubular members 23 on that side of each filter frame provided with the rollers 43. Any of the solids falling onto the plate 48 are by it diverted onto the chute 47. To preclude the possibility of violent oscillations of the filter frames as they swing back from the inclined position (shown at 46 in Fig. 2) into the normal position, (with the filtering surface horizontal or substantially horizontal) the plates 44 are constructed to provide suitably curved paths or surfaces 49. As the apparatus continues to revolve the rollers 43 of the inclined frame after leaving the paths 45 traverse the paths 49 and the farmes are thereby caused to gently swing back into position as they enter the tank 42.

For creating the suctional flow through the machine the hollow portion 3 of the driving shaft is extended beyond the bearing 5—see Fig. 1—and the open end of said part 3 projects into a chamber formed in a piece or casting 50.

51 is a gland fitted to the casting 50 around the end of the part 3, and 52 is a flanged branch formed upon the casting for making connection with the suction-creating apparatus.

The back pressure flow through the machine is established through the medium of a pipe 53 which at one extremity—see Fig. 7—is screwed or otherwise suitably fixed in the end of the bore of the part 2 of the shaft. The pipe 53, whose external diameter is less than that of the bore of the part 3, extends concentrically through said part 3 and through the casting 50, and at its outer extremity communicates with a chamber formed in another piece or casting 54.

55 is a gland fitted to the casting 54 around the end of the pipe 53, and 56 is another gland fitted to the casting 50 around pipe 53.

The casting 54 is constructed with a flanged branch 54ª for making connection with the back pressure creating apparatus. The arrows in Figs. 1 and 7 clearly indicate the direction of both suction and back pressure flows. The castings are shown arranged upon the support or foundation 7 carrying the bearing 5.

To increase the rigidity of the revoluble portion of the structure a ring 55ª, see Fig. 2, which is formed with a semi-circular or approximately semi-circular recess for each spoke, is bolted, to each of the circular end frames by means of corresponding semi-circularly recessed pieces 56ª, or otherwise. The rings 55ª are connected between the spokes by means of the longitudinal bolts 57, which serve as distance pieces between the circular frames and as longitudinal tie rods for the structure.

The operation of the apparatus, in view of the foregoing detailed description, need only be briefly described. The tank 42 is first filled with the mixture of solids and liquid to be separated up to the level $a\ a$, and the inflowing volume then regulated, if necessary, to maintain it at or about that level. The suction and back pressure creating means having both been set in motion the apparatus is rotated at a suitable speed. As the spindle of each suction valve successively contacts with the cam plate 41,—which it does immediately its filter frame is submerged—a partial vacuum is created in the space between the coverings of filtering material and the liquid and the mixture is thereby drawn through the interstices of said material into said space and from the latter through the tubular members 23, tubular shaft 20, circumferential passage 16, hollow spoke 11, space 15, annular recess 14, hollow part 3 of the shaft to the suction chamber whence it is withdrawn through the branch pipe 52. One or more of the suction valves are always open so that a continuous flow of the separated liquid is obtained. As the liquid is drawn through the filtering material the particles of solid matter are caused to adhere to the exterior of said filtering material. The valves as previously described are automatically closed, by the spindles disengaging the cam plate 41, preferably a short time after the filter frame rises above the level of the mixture in the tank 42 so as to extract any mixture remaining in the adhering solid matter and to drain the passages of the filtrate. The back pressure, (for which a gaseous fluid such as atmospheric air under a suitable pressure is preferably employed) is admitted successively to the filter frames as the back pressure valves are opened by their spindles contacting with the cam plates 40, which they do after the frames have been tilted or inclined as represented at 46 in Fig. 2. The fluid under pressure, which is always present in the casting 54 pipe 53 part 2 of the driving shaft, recess 14, spaces 15, spokes 11 and circumferential passages 16 flows through each valve as it is opened and through the tubular shaft 20 tubular members 23 to the space between the coverings of filtering material and so forces the solids off the exterior surface of the latter. The detached solids then fall down the chute or inclined plane 47 as has been hereinbefore particularly described.

What I claim as my invention and desire to protect by Letters Patent is:—

1. In filtering apparatus, in combination, a pair of revoluble end frames, a plurality of oscillatory filter frames suspended between said end frames, and means for creating alternately suctional or filtering and back pressure flows through said filter frames, as set forth.

2. In filtering apparatus, in combination, a pair of revoluble end frames, a plurality of oscillatory filter frames suspended between said end frames, means for creating a suctional or filtering flow through said filter frames through the medium of one end frame, and means for creating a back pressure flow through said filter frames through the medium of the other end frames, as set forth.

3. In filtering apparatus, in combination, a pair of revoluble end frames, a plurality of oscillatory filter frames suspended between said end frames, means for creating a suctional or filtering flow successively through said filter frames through the medium of one end frame and during a predetermined portion only of the revolution of said end frame, and means for creating a back pressure flow successively through said filter frames through the medium of the other end frame and during a predetermined portion only of the revolution of said end frame, as set forth.

4. In filtering apparatus, in combination, a pair of revoluble end frames, a plurality of oscillatory filter frames suspended between said end frames, each of said filter frames comprising a frame covered top and bottom with filtering material, a tubular shaft by means of which the filter frame is supported between the end frames, and tubular members which place the space formed between the coverings of filtering material in communication with the tubular shaft, and means for alternately creating suctional and back pressure flows through the tubular shaft during predetermined portions of the revolution of the apparatus, as set forth.

5. In filtering apparatus, in combination, a pair of revoluble end frames, and a plurality of oscillatory filter frames suspended between said end frames, each of said filter frames comprising a skeleton frame covered top and bottom with filtering material, a tubular shaft which at its extremities projects into holes in the revoluble end frames and is supported thereby between said frames, and tubular members which serve for placing the space formed between the coverings of filtering material on the frame in communication with the tubular shaft, said frame, tubular shaft and tubular members being separable parts having lugs and flanges for connecting them, as set forth.

6. In filtering apparatus, in combination, a pair of revoluble end frames, and a plurality of oscillatory filter frames suspended between said end frames, each of said filter frames comprising a frame covered with filtering material, a tubular shaft by means of which the filter frame is suspended between the end frames and tubular members placing the interior of said shaft in communication with the space between the coverings of filtering material, the end frames having suction and back pressure passages with which the tubular shafts are adapted to be placed in communication, and automatically operated valves for establishing communication between the tubular shafts and suction and back pressure passages in the end frames during predetermined portions of the revolution of the apparatus as set forth.

7. In filtering apparatus, in combination, a pair of revoluble end frames, and a plurality of oscillatory filter frames suspended between said end frames, each of said filter frames comprising a frame, covered with filtering material, a tubular shaft which serves for suspending the filter frame between the end frames and tubular members placing the bore of the tubular shaft in communication with the space formed between the coverings of filtering material on the frame, one end frame having suction passages with which the tubular shafts at one extremity are adapted to be placed in communication and the other end frame having back pressure passages with which the tubular shafts at their other extremities are adapted to be placed in communication, and two sets of valves for opening and closing communication between the tubular shafts and the suction and back pressure passages in the end frames, and means for automatically and independently actuating both sets of valves during predetermined portions of the revolution of the apparatus, as set forth.

8. In filtering apparatus, in combination, a pair of revoluble end frames and a plurality of oscillatory filter frames suspended between said end frames, each of said filter frames comprising a frame covered with filtering material, a tubular shaft and tubular members which place the space formed between the coverings of filtering material in communication with the tubular shaft, the end frames having suction and back pressure passages and holes in which the ends of the tubular shafts are rotatably carried, caps fixed to the rim portions of the end frames over the ends of the tubular shafts, valves positioned in said caps and further caps secured to the rim portions over the first mentioned caps for placing the passages in the rim portions in communication through the valves with the tubular shafts, and means for automatically opening said valves during predetermined portions of the revolution of the apparatus, as set forth.

9. In filtering apparatus, in combination, a pair of revoluble end frames and a plurality of oscillatory filter frames suspended between said end frames, each of said filter frames comprising a frame covered with filtering material, a tubular shaft and tubular members which place the space formed between the coverings of filtering material in communication with the tubular shaft, one of the end frames having suction passages in its rim portion and the other end frame back pressure passages in its rim portion and both end frames having holes in which the ends of the tubular shafts are rotatably carried, caps fixed to the rim portions of the end frames over the ends of the tubular shafts, said caps being constructed to provide valve faces, valves arranged in said caps, springs for maintaining said valves on their seats, guide pins fixed to the valves which are adapted to work through holes formed in bridge pieces at the ends of the tubular shafts, further caps secured to the rim portions over the first mentioned caps for placing the passages in the rim portions in communication through the valves with the tubular shafts, spindles attached to the valves which work through holes in the outer caps and means for engaging the outer extremities of said valve spindles to successively open the valves during predetermined portions of the revolution of the apparatus, as set forth.

10. In filtering apparatus, in combination, a pair of revoluble end frames and a plurality of oscillatory filter frames suspended between said end frames, one of the end frames having suction passages and the other back pressure passages, valves for placing said passages in communication with the filter frames, means comprising a suitably curved cam plate arranged on the outside of each end frame for opening the valves during predetermined portions of the revolution of the apparatus, as set forth.

11. In filtering apparatus, in combination, a pair of revoluble end frames and a plurality of oscillatory filter frames suspended between said end frames, means for creating alternately suction or filtering and back pressure flows through said filter frames, and means for successively tilting or inclining the filter frames before the back pressure is admitted, as set forth.

12. In filtering apparatus, in combination, a pair of revoluble end frames and a plurality of oscillatory filter frames suspended between said end frames, means for creating alternately suction or filtering and back pressure flows through said filter frames, and means for successively tilting or inclining the filter frames before the back pressure is admitted, said latter means comprising a suitably inclined path and rollers fixed on the ends of the frame for engaging the path as the apparatus is rotated, as set forth.

13. In filtering apparatus, in combination, a pair of revoluble end frames and a plurality of oscillatory filter frames suspended between said end frames, means for creating alternately suction or filtering and back pressure flows through said latter frames, and means for successively tilting or inclining the filter frames before the back pressure is admitted, said latter means comprising a suitably inclined path and rollers fixed on the ends of the frames for engaging the path as the apparatus is rotated, a chute or inclined plane for conducting the separated solids clear of the apparatus, and an inclined plate fixed to each filter frame for diverting the detached solids on to the chute or inclined plane, as set forth.

14. In filtering apparatus, in combination, a pair of revoluble end frames and a plurality of oscillatory filter frames suspended between said end frames, means for creating alternately suction or filtering and back pressure flows through said filter frames, and means for successively tilting or inclining the filter frames before the back pressure is admitted and means for preventing violent oscillations of the filter frames as they swing back into position after disengaging the tilting means, as and for the purpose set forth.

15. In filtering apparatus, in combination, a pair of revoluble end frames, and a plurality of oscillatory filter frames suspended between said frames, means for creating alternately suction or filtering and back pressure flows through said filter frames, and means for successively tilting or inclining the filter frames before the back pressure is admitted, and means for preventing violent oscillations of the filter frames as they swing back into position after disengaging the tilting means, said means comprising a suitably curved surface or path with which the rollers on the filter frames engage after they leave the tilting path, as set forth.

16. In filtering apparatus, in combination, a pair of revoluble end frames comprising a hub portion having an annular recess and a plurality of spaces in communication with said recess, a rim portion formed with passages and tubular spokes connecting the hub spaces with said rim passages, a plurality of oscillatory filter frames suspended between said end frames, means for placing said filter frames in communication with the passages in the rim portions of the end frames during predetermined portions of the revolution of the apparatus, a hollow shaft connecting the hub portions, means placing the annular recess in the one hub in communication with a suction chamber and means for placing the annular recess in the other hub in communication with a back pressure chamber, as set forth.

17. In filtering apparatus, in combination, a pair of revoluble end frames comprising a hub portion having an annular recess and a plurality of spaces in communication with said recess, a rim portion formed with passages and tubular spokes connecting the hub spaces with said rim passages, a plurality of oscillatory filter frames suspended between said end frames, means for placing said filter frames in communication with the passages in the rim portions of the end frames during predetermined portions of the revolution of the apparatus, a hollow shaft connecting the hub portions, means placing the annular recess in the one hub in communication with a suction chamber, said means comprising a tubular member communicating at one end with the suction chamber and at the other end with the annular recess in the hub and means for placing the annular recess in the other hub in communication with a back pressure chamber, said means comprising a tubular member communicating at one end with the back pressure chamber and at the other end with the bore of the hollow shaft, as set forth.

18. In filtering apparatus, in combination, a pair of circular end frames, one of which is used exclusively for the suctional and filtering flow, and the other exclusively for the back pressure flow, each of said frames comprising a rim portion provided with circumferential passages, a hub portion having an annular recess in the bore thereof and spaces in communication with said annular recess, and tubular spokes placing said hub spaces in communication with the circumferential passages in the rim portion, a driving shaft consisting of three sections, a solid flanged end section for the hub of the back pressure frame, a tubular intermediate section flanged at both ends for connecting the hubs of both frames, and a hollow flanged section for the hub of the suction frame, a suction chamber connected with said hollow flanged section of the driving shaft, a pipe fixed at one end into the bore of the tubular intermediate section of the driving shaft and extending concentrically through the hollow flanged section, and a back pressure chamber connected with said pipe, as set forth.

In testimony whereof I have signed my name to this specification in the presence of two subscribing witnesses.

ALEXANDER JOHN ARBUCKLE.

Witnesses:
 CHAS. OVENDALE,
 F. A. OVENDALE.